J. CHILCOTT.
Gas Retort.
No. 2,000. Reissued June 20, 1865.
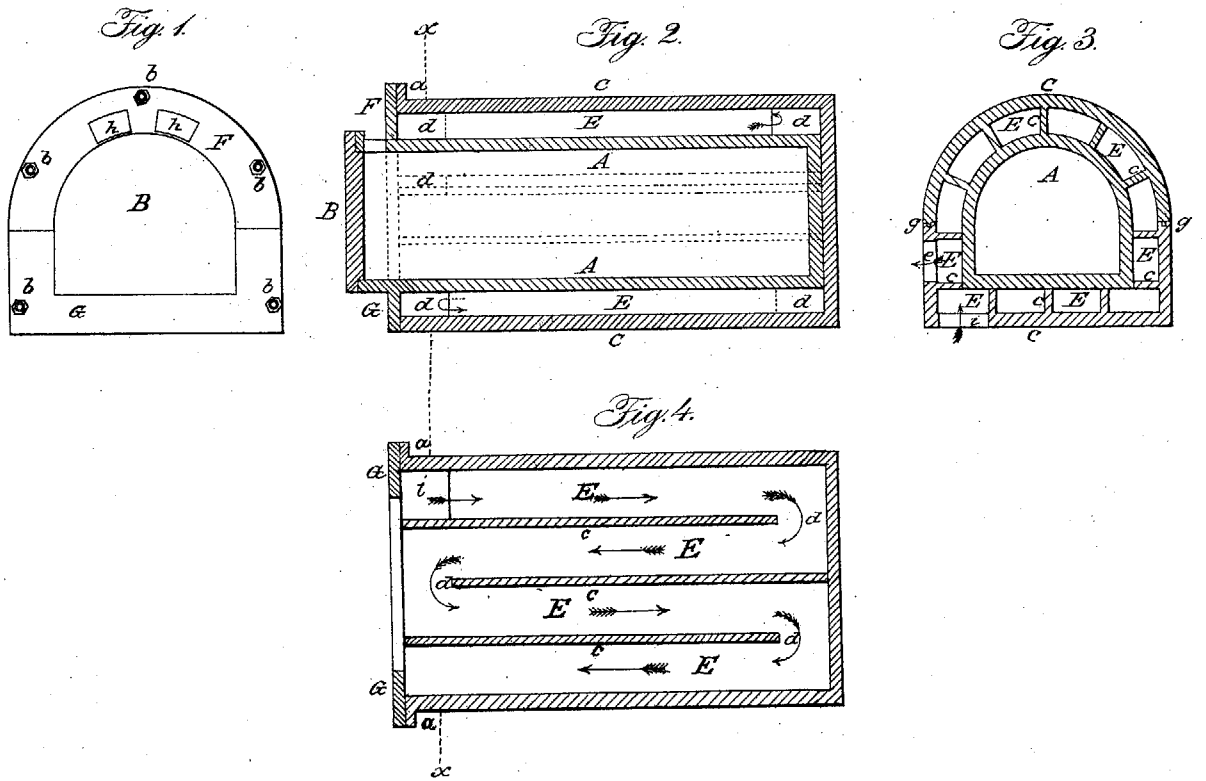
Witnesses:
Hippolyte Mali
Chas E. Frost
Inventor:
John Chilcott
AM. PHOTO-LITHO. CO. N.Y. (OSBORNE'S PROCESS)

UNITED STATES PATENT OFFICE.

JOHN CHILCOTT, OF BROOKLYN, NEW YORK.

IMPROVEMENT IN GAS AND OTHER RETORTS.

Specification forming part of Letters Patent No. 45,908, dated January 17, 1865, antedated January 6, 1865; Reissue No. 2,000, dated June 20, 1865.

*To all whom it may concern:*

Be it known that I, JOHN CHILCOTT, of Brooklyn, in the county of Kings and State of New York, have invented a new and useful Improvement in Gas and other Retorts; and I do hereby declare that the following is a full, clear, and exact description of the same, reference being had to the acompanying drawings, forming part of this specification, in which—

Figure 1 is a front view of a retort with my improvement. Fig. 2 is a central longitudinal vertical section of the same. Fig. 3 is a transverse section of the same in the plane indicated by the line *x x* in Figs. 2 and 4. Fig. 4 is a horizontal section of the retort-casing below the retort.

Similar letters of reference indicate corresponding parts in the several figures.

The object of this invention is to heat one or more retorts in a more economical manner than under the system heretofore practiced by reducing the consumption of fuel; and to this end it consists in surrounding one or more retorts with a continuous system of flues, through which the flame and heated gaseous products of combustion from the furnace may circulate back and forth several times along and once all around the retort or retorts before escaping to the chimney.

It also consists in a certain construction of such a system of flues whereby provision is made for cleaning them.

To enable others skilled in the art to make and use my invention, I will first describe the example represented in the drawings, and afterward describe briefly certain modifications.

A in the drawings is the retort made of fire-clay or cast-iron, of the usual D-shape represented in Fig. 3, or of other suitable form, and having a movable head, B, at the front end.

C is the jacket or casing of the same material as the retort, and having a transverse sectional form corresponding with that of the retort, but of considerably larger area, so as to provide a sufficient space between its interior and the exterior of the retorts all around to form the flues E E. This jacket or casing is somewhat shorter than the retort, so that the retort fitting close against its closed rear end may protrude some distance from its rear end, as shown in Fig. 2. The open front end of said casing is constructed with an external projecting flame, *a*, at its top and sides, to which to attach movable head-plates F and G by screw-bolts *b b*, for the purpose of closing the front of the flue-space between it and the retort, the said plates fitting closely around the exterior of the retort.

*c c* are the longitudinal partitions between the retort and the jacket or casing which divide the intermediate space into flues E E, arranged at equal distances apart all around the retort and jacket, those which are between the flat bottom and sides of the retort and jacket being at right angles thereto, and those between the arched tops thereof being radial thereto. These partitions are formed upon the interior of the jacket and fit closely to the exterior of the retort, and they extend the whole length of the retort and jacket, except that in each there is an opening, *d*, the said opening in one being at the front end, and that in the next on either side being at the other end, as shown in Figs. 2 and 4.

The retort is supported within the jacket C by resting on the upper edges of the partitions *c c*.

*i* is the inlet-opening in the jacket leading to the system of flues E E. This opening is situated in the bottom at the front end and close to the left-hand side of the retort and jacket, as shown in Figs. 3 and 4.

*e* is the exit-opening in the lowest flue on the left-hand side of the retort, next to that flue in which is the inlet-opening *i*, as shown in Fig. 3.

The opening *d* in the partitions *c c* are respectively so arranged relatively to the inlet and exit openings *i* and *e* that the flame and heated gaseous products of combustion from the furnace, entering one flue at the inlet-opening, may pass in a rearward direction along that flue, return in a forward direction by the next one at the right-hand, repass in a rearward direction along the next, and so on through all the flues under the bottom of the retort, thence back and forth through those on the right-hand side, afterward through those on the top, and finally through those on the left-hand side, thus making the complete circuit of the retort, and escaping by the exit-opening.

In order to provide for the removal of the retort from the jacket and introducing a new retort or jacket, the jacket is divided horizontally and longitudinally into two parts, which are fitted together with tongues and grooves, as shown at *g g* in Fig. 3.

The cleaning out of the flues may be effected by taking off the removable head-plates F and G, the junction of which corresponds with the junction of the upper and lower portions of the jacket. To obviate the necessity of taking off these heads, there may be provided therein a series of openings, one opposite to each flue, the said openings being fitted with removable bonnet-plates *h h*, as shown in Fig. 1.

Any convenient number of retorts, each fitted with a flue-jacket, C, or otherwise surrounded with a system of flues, E E, similar to that described, may be arranged in one bench, provided the inlet-openings *i* of the several jackets or system of surrounding flues are properly arranged with respect to the fire place or furnace, and the exit-openings *e* are properly arranged with respect to the chimney, that all the flames and heated products of combustion may pass through the jackets or system of flues on their way to the chimney, the flame and gaseous products being properly divided between the several jackets or systems of flues surrounding the several retorts.

Each jacket C or system of flues E E may be provided with more than one inlet-opening, and more than one outlet-opening, if the openings *d* in the partitions *c c* are properly arranged. The inlet and outlet openings may be reversed—that is to say, *e* may be the inlet and *i* the outlet.

Although I consider it preferable, when several retorts are arranged in one bench, to completely surround each retort with a separate and distinct system of flues such as I have described and represented in the accompanying drawings, a similar continuous surrounding system or flues may be made to embrace within its circuit two or more retorts or the whole set.

What I claim as my invention, and desire to secure by Letters Patent, is—

1. Surrounding one or more gas or other retorts with a continuous system of flues, E E, through which the flame and gaseous products from the furnace circulate back and forth several times along and once all around the retort or retorts, substantially as and for the purpose herein set forth.

2. The jacket or casing, C, divided longitudinally into two parts, and having the flue partitions attached to its interior, so as to be detachable from the retort, substantially as and for the purpose herein specified.

JOHN CHILCOTT.

Witnesses:
HIPPOLYTE MALI,
CHAS. E. FROST.